(No Model.)
W. B. PACKARD.
SULKY PLOW, &c.
No. 262,465. Patented Aug. 8, 1882.
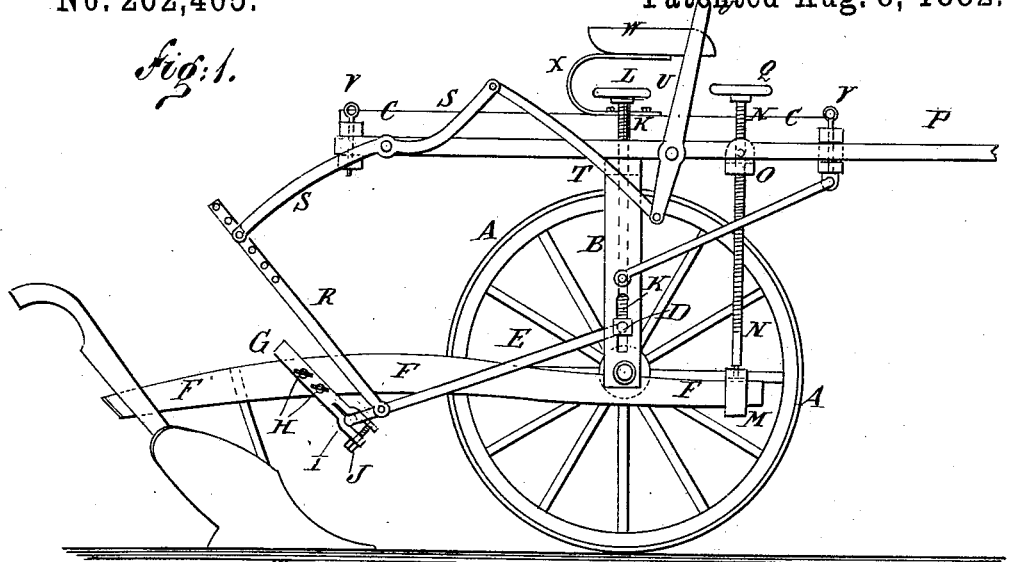
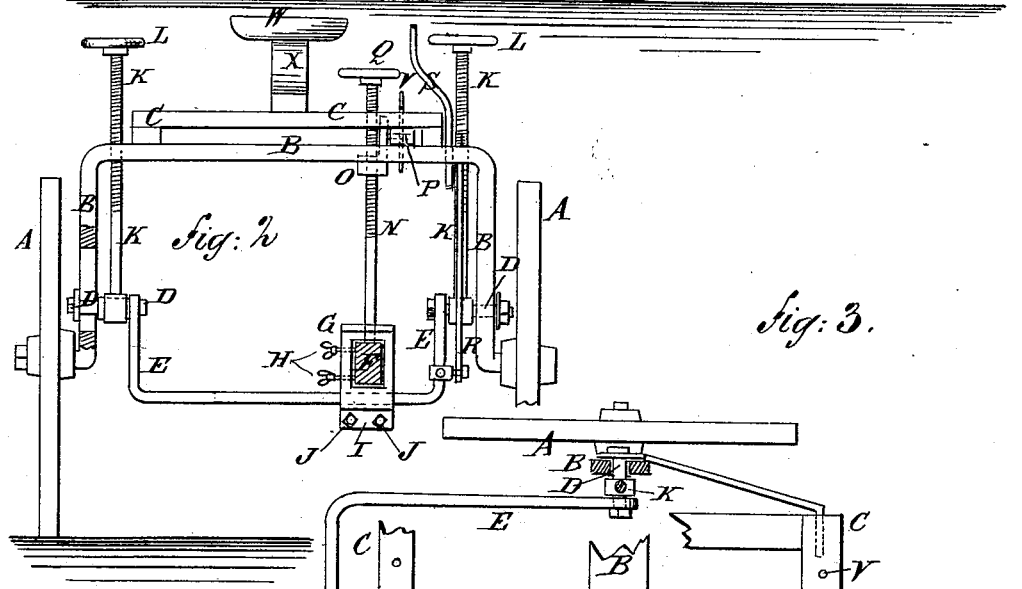
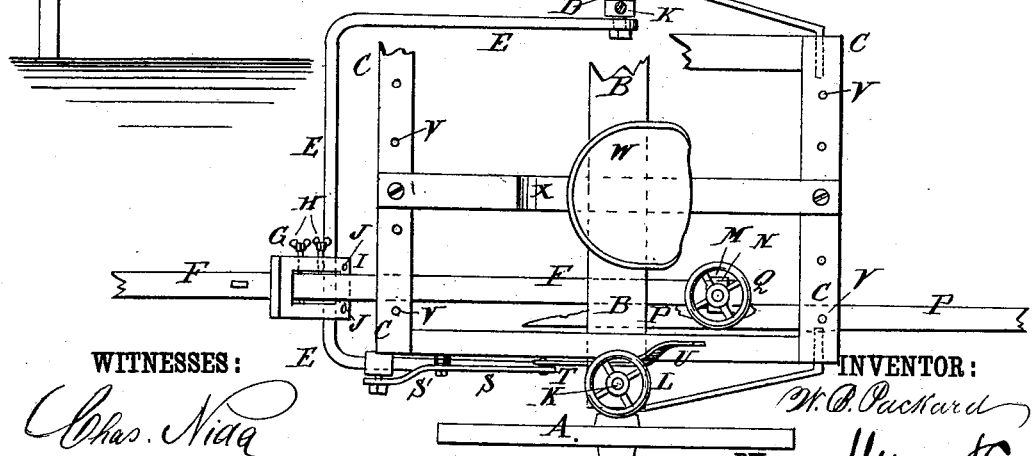
WITNESSES:
Chas. Nida
C. Sedgwick
INVENTOR:
W. B. Packard
BY Munn & Co
ATTORNEYS.

UNITED STATES PATENT OFFICE.

WILLIAM B. PACKARD, OF BLOOMINGTON, ILLINOIS.

SULKY-PLOW, &c.

SPECIFICATION forming part of Letters Patent No. 262,465, dated August 8, 1882.

Application filed April 24, 1882. (No model.)

*To all whom it may concern:*

Be it known that I, WILLIAM BULLOCK PACKARD, of Bloomington, in the county of McLean and State of Illinois, have invented a new and useful Improvement in Sulky Plows and Cultivators, of which the following is a full, clear, and exact description.

Reference is to be had to the accompanying drawings, forming a part of this specification, in which similar letters of reference indicate corresponding parts in all the figures.

Figure 1 is a side elevation of my improvement, the off wheel being removed. Fig. 2 is a rear elevation of the same, part being broken away and the plow-beam being shown in section. Fig. 3 is a plan view of the same, parts being broken away.

The object of this invention is to facilitate the adjusting and controlling of plows and cultivators attached to sulkies.

The nature of the invention consists in the combination and arrangement of parts hereinafter fully described.

A represents the sulky-wheels, the axle B of which is bent four times at right angles to raise or arch its middle part, and adapt it to pass over tall plants and to support the frame C at the proper elevation.

The upright parts of the axle B are slotted longitudinally to receive the arms D, the outer ends of which pass through the slots of the axle B, and are secured in place by nuts screwed upon the said ends.

To the inner ends of the arms D are hinged the ends of the bail E, with which the plow-beam F is connected, or the frame of a cultivator.

Upon the plow-beam F is placed a rectangular link or clamp, G, which is secured in place by one or more set-screws, H, passing through a side bar of the said link and resting against the side of the said plow-beam.

Upon the lower end bar of the link G is formed a bearing, I, to receive the middle part of the bail E, and which is secured to the said bail by the clamping-screws J, so that the link G, by loosening the said clamping-screws J, can be adjusted laterally to receive the beam of a right-hand plow or a left-hand plow, or to allow several plows to be connected with the same bail, E.

To the inner parts of the arms D are swiveled the lower ends of screws K, which pass through screw-holes in the horizontal middle part of the axle B, and have hand-wheels L attached to their upper ends. With this construction, by turning the screws K the arms D can be raised or lowered to adjust or level the plow or cultivator, as may be required.

The forward part of the plow-beam F is passed through a link, M, to the upper end of which is swiveled the end of a screw, N. The screw N, passing through a nut, O, is hinged to the tongue P by a bolt or other suitable means, and has a hand-wheel, Q, attached to its upper end. By this construction, by turning the screw N the forward end of the plow-beam can be raised and lowered to cause the plow to run shallower or deeper in the ground.

To the rear part of the draw-bail E is hinged the lower end of a connecting-rod, R, to the upper end of which is hinged the rear end of the lever S. Several holes are formed in the upper part of the connecting-rod R to receive the hinging bolt or pin, so that the lever S can be adjusted to raise the plow more or less, as may be required.

The lever S is fulcrumed to the rear part of a side bar of the frame C, and to its forward end is hinged the upper end of a connecting-bar, T, the lower end of which is hinged to the lower end of the lever U. The lever U is fulcrumed to a side bar of the frame C, and its upper end projects into such a position that it can be readily reached and operated by the driver from his seat to raise and lower the plow.

The tongue P is secured to the front and rear cross-bars of the frame C by bolts or pins V, and several holes are formed in the said cross-bars to receive the said bolts or pins, so that the tongue P can be adjusted laterally to correspond with the adjustment of the plow-beam, so that the said tongue can be kept nearly over the said plow-beam.

The driver's seat W is attached to the upper arm of a U-spring, X, the lower arm of which is secured to the middle part of the frame C.

In the foregoing description of my improvements they are described as applied in a single sulky-plow. Two or more plows may be attached thereto, and the same be used as a gang-plow, and the same are equally applicable for use with one or more cultivators as a sulky-cultivator.

Having thus described my invention, I claim as new and desire to secure by Letters Patent—

1. In a sulky plow or cultivator, the combination, with the plow-beam F and its eye G, having a clamp, I J, and set-screws H, of the bail E, connected to an adjustable bolt, D, controlled by a hand-wheel screw, K, and the slotted upright bow or frame B, which receives the bolt D, substantially as shown and described, and for the purpose set forth.

2. In a sulky plow and cultivator, the combination, with the plow-beam F and its eye G, having the clamp I J and screws H, and the pivoted bail E, of the bars R and T and levers S and U, substantially as shown and described, and for the purpose set forth.

WILLIAM B. PACKARD.

Witnesses:
JOHN STAPLETON,
H. R. BENSON.